(12) United States Patent
Mastrocola et al.

(10) Patent No.: US 8,929,013 B1
(45) Date of Patent: Jan. 6, 2015

(54) STORAGE SYSTEM WITH PATTERN DEPENDENT WRITE

(71) Applicant: LSI Corporation, San Jose, CA (US)

(72) Inventors: Angelo R. Mastrocola, West Lawn, PA (US); David W. Kelly, Eagan, MN (US); Ross S. Wilson, Menlo Park, CA (US); Jason P. Brenden, Woodbury, MN (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/085,816

(22) Filed: Nov. 21, 2013

Related U.S. Application Data

(60) Provisional application No. 61/902,131, filed on Nov. 8, 2013.

(51) Int. Cl.
*G11B 5/09* (2006.01)
*G11B 5/02* (2006.01)

(52) U.S. Cl.
USPC .................................. 360/46; 360/51; 360/59

(58) Field of Classification Search
None
See application file for complete search history.

(56) References Cited

U.S. PATENT DOCUMENTS 8,315,128 B1 * 11/2012 Wilson et al. .............. 369/13.02
2012/0243390 A1    9/2012 Lennard et al.
2013/0128375 A1 *  5/2013 Livshitz et al. ................. 360/48

* cited by examiner

*Primary Examiner* — Regina N Holder
(74) *Attorney, Agent, or Firm* — Hamilton DeSanctis & Cha

(57) ABSTRACT

A storage system with pattern dependent write includes a magnetic write head, a magnetic storage medium, a read channel operable to process write data to be recorded on the magnetic storage medium by the magnetic write head, and a preamplifier operable to receive the write data and an associated clock from the read channel, to generate a pattern dependent write control signal based on a pattern in the write data and on the clock, and to set a write current level through the magnetic write head to a number of different current levels based on the pattern dependent write control signal.

20 Claims, 4 Drawing Sheets

STORAGE SYSTEM WITH PATTERN DEPENDENT WRITE

CROSS REFERENCE TO RELATED APPLICATIONS

The present application claims priority to (is a non-provisional of) U.S. Pat. App. No. 61/902,131, entitled "Storage System With Pattern Dependent Write", and filed Nov. 8, 2013 by Mastrocola et al, the entirety of which is incorporated herein by reference for all purposes.

FIELD OF THE INVENTION

Various embodiments of the present invention provide systems and methods for deriving a pattern dependent write control signal in a magnetic recording system preamplifier based on a data signal and a clock signal.

BACKGROUND

Various magnetic recording systems such as hard disk drives utilize a write head to record data on a magnetic medium. Data to be recorded is provided to the write head coil as an alternating electrical current. The electrical current passes through a metallic coil wrapping around the write head, generating a magnetic field. The magnetization state of a pole tip in the write head is switched by the magnetic field. As the magnetized pole tip is passed over the magnetic storage medium, for example a spinning ferromagnetic platter, the magnetization of regions of the magnetic medium below the pole tip are altered and can later be read back to retrieve the data.

The write (recording) process is challenging at high speeds in magnetic recording. Conventional write current waveforms used to drive the write head to record data on a given track are fixed in terms of the write current pulse characteristics. However, the switching response of the magnetic system is not linear. The magnetic response for one write pulse can be considered as a three-stage process: switching (stage I), transition to saturation (stage II), and saturation (stage III). The third and even possibly the second stage may be truncated in the case of a high density recorded pattern when the bit cell period (T) is less than the magnetic switching time. The non-linearity between excitation and response signals is more pronounced as the data rate increases and the bit sequence includes more high frequency transitions. The following negative effects accompany this recording process: first, an increase in the curvature of the transitions; second, a bit-to-bit transition degradation; third, a track width modulation. As a result, the global recording performance degrades, and data rate and areal density are limited.

Because magnetic recording systems are continually being enhanced with areal density and faster data rates, there exists a need in the art for improving the write process.

BRIEF SUMMARY

Various embodiments of the present invention provide apparatuses, systems and methods for deriving a pattern dependent write control signal in a magnetic recording system preamplifier. For example, a storage system is disclosed that includes a magnetic write head, a magnetic storage medium, a read channel operable to process write data to be recorded on the magnetic storage medium by the magnetic write head, and a preamplifier operable to receive the write data and an associated clock from the read channel, to generate a pattern dependent write control signal based on a pattern in the write data and on the clock, and to set a write current level through the magnetic write head to a number of different current levels based on the pattern dependent write control signal.

This summary provides only a general outline of some embodiments according to the present invention. Many other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components.

DETAILED DESCRIPTION OF THE INVENTION

Various embodiments of the present invention provide apparatuses, systems and methods for deriving a pattern dependent write control signal in a magnetic recording system preamplifier. A read channel circuit provides write data to be stored on a magnetic storage medium, along with a clock associated with the write data, to a preamplifier. The write data and clock are transmitted in some embodiments over a flexible cable between the read channel circuit and the preamplifier, allowing the preamplifier and associated write head to be moved over the magnetic storage medium.

The preamplifier uses the clock to retime the write data and to locally derive and use a pattern dependent write control signal. The pattern dependent write control signal is then used to modulate the write current used to record the write data on the magnetic storage medium. In general, the write current is modulated to compensate for magnetic effects which would otherwise degrade the written magnetic signal. For example, in some embodiments, the pattern dependent write control signal is used to control a multi-level write current that has multiple different current levels available for use in writing a data bit. For example, when the magnetic polarity of a pole tip in the write head needs to be quickly changed to record a particular data pattern, the pattern dependent write control signal can request a higher write current level than a normal lower write current level. By deriving the pattern dependent write control signal in the preamplifier, the design of the read channel is simplified and standardized. Simple data and clock signals can be transmitted from the read channel to the preamplifier over the flexible cable, reducing the bandwidth and/or signal integrity requirements and/or number of conductors in the flexible cable. A wider range of pattern dependent write systems can be supported by changing the design or settings in the preamplifier.

Figure 1:
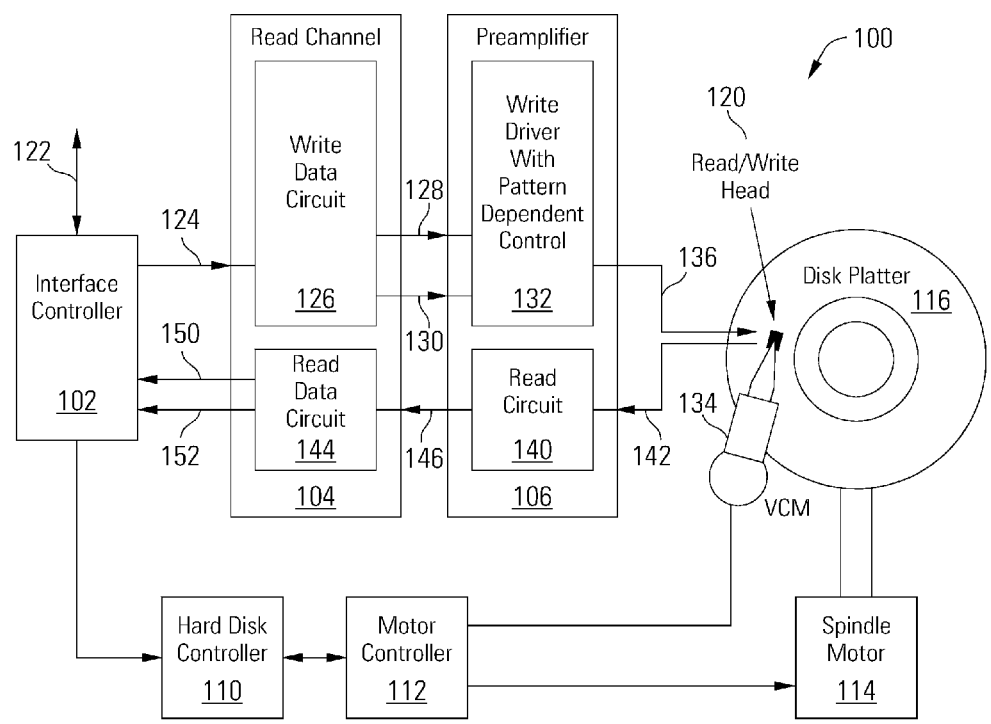
FIG. 1 depicts a magnetic storage system including a read channel circuit, preamplifier and write head, wherein a pattern dependent write control signal is generated in the preamplifier in accordance with some embodiments of the present invention.

Turning to FIG. 1, a magnetic storage system 100 is shown which includes a preamplifier that derives a pattern dependent write control signal from write data and clock signals in accordance with some embodiments of the invention. Storage system 100 includes an interface controller 102, read channel circuit 104, preamplifier 106, a hard disk controller 110, a motor controller 112, a spindle motor 114, a disk platter 116, and a read/write head assembly 120. Interface controller 102 controls addressing and timing of data to/from disk platter 116. The interface controller 102 can include devices such as a processor, buffer memory, format control, error correction circuits, and interface circuits. The data on disk platter 116 consists of groups of magnetic signals that can be written and detected by read/write head assembly 120 when the assembly is properly positioned over disk platter 116. In one embodiment, disk platter 116 includes magnetic signals recorded in accordance with either a longitudinal or a perpendicular recording scheme.

In a typical write operation, interface controller 102 receives digital data 122 to be stored on the disk platter 116 and provides corresponding digital write data 124 to a write data circuit 126 in the read channel 104. The digital data 122 can be received in serial form on a standardized device interface such as a Serial Advanced Technology Attachment (SATA) interface. During write operations, the digital data 122 is stored in a local buffer memory, formatted and augmented with error correction codes.

Write data circuit 126 can process the digital write data 124 in a number of ways, such as serializing the data, modulation coding the data and adding parity bits, serializing the data at the desired bit-rate, and performing write precompensation. The write data circuit 126 provides encoded write data 128 and an associated clock 130 to a write driver 132 in preamplifier 106. In some embodiments, the preamplifier 106 is mounted on an actuator arm 134, and the encoded write data 128 and clock 130 are driven from the read channel 104 by transmitters and delivered over a flexible cable or flex-cable in differential positive emitter-coupled logic (PECL) format or another format to the write driver 132 in the arm-mounted preamplifier 106. The preamplifier 106 retimes the encoded write data 128 with the clock 130 and generates a pattern dependent write control signal based on the write data 128 and clock 130. The preamplifier 106 can also convert the encoded write data 128 to an analog signal, perform waveshaping, add overshoot pulses or otherwise modulate the write current based on the pattern dependent write control signal to aid the recording process, and provide to the write head portion of read/write head assembly 120 a bipolar programmable write current 136 of polarity determined by that of the PECL (or other format) input. In various pattern dependent write embodiments, characteristics of the write current are controlled based on the initial magnetic state of the pole tip in the read/write head assembly 120, as determined by the specific patterns in the write data 128.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate. A read circuit 140 in the preamplifier 106 establishes a bias current in the magneto-resistive read head on read/write head assembly 120. Once read/write head assembly 120 is positioned onto the proper data track, magnetic signals representing data on disk platter 116 are sensed by read/write head assembly 120 as disk platter 116 is rotated by spindle motor 114. The sensed magnetic signals are provided as a continuous, minute analog signal 142 representative of the magnetic data on disk platter 116. This minute analog signal 142 is transferred from read/write head assembly 120 to read circuit 140 in the preamplifier 106, where it is amplified and is conveyed to a read data circuit 144 in the read channel 104 as analog read data 146. In turn, read data circuit 144 processes and digitizes the received analog signal to recreate the user data originally written to disk platter 116, as well as extracting servo information.

As part of processing the analog read data 146, read data circuit 144 can perform one or more operations such as variable gain amplification, analog filtering, analog to digital conversion, equalization, timing recovery, data detection, decoding, deserialization, and servo demodulation to obtain the user data and servo information. The user data is provided by read data circuit 144 as digital read data 150 to the interface controller 102, where it is error-corrected, stripped of special formatting fields, and reassembled in a buffer memory for transmission to a user device as digital data 122. The read channel 144 also provides the servo data 152 to the interface controller 102 for use in driving the hard disk controller 110 and motor controller 112. During both the read and write operations, microcode in the interface controller 102 controls spindle speed and regulates head position to maintain accurate track-following and to seek between tracks. Servo position information for these functions is demodulated by the read data circuit 144 from dedicated fields prerecorded on the disk platter 116 at intervals between data records.

It should be noted that storage system 100 can be integrated into a larger storage system such as, for example, a RAID (redundant array of inexpensive disks or redundant array of independent disks) based storage system. Such a RAID storage system increases stability and reliability through redundancy, combining multiple disks as a logical unit. Data can be spread across a number of disks included in the RAID storage system according to a variety of algorithms and accessed by an operating system as if it were a single disk. For example, data can be mirrored to multiple disks in the RAID storage system, or may be sliced and distributed across multiple disks in a number of techniques. If a small number of disks in the RAID storage system fail or become unavailable, error correction techniques can be used to recreate the missing data based on the remaining portions of the data from the other disks in the RAID storage system. The disks in the RAID storage system can be, but are not limited to, individual storage systems such storage system 100, and can be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 100 can be modified to include solid state memory that is used to store data in addition to the storage offered by disk platter 116. This solid state memory may be used in parallel to disk platter 116 to provide additional storage. In such a case, the solid state memory receives and provides information directly to read channel 104. Alternatively, the solid state memory can be used as a cache where it offers faster access time than that offered by disk platter 116. In such a case, the solid state memory can be disposed between interface controller 102 and read channel 104 where it operates as a pass through to disk platter 116 when requested data is not available in the solid state memory or when the solid state memory does not have sufficient storage to hold a newly written data set. Based upon the disclosure provided herein, one of ordinary skill in the art will recognize a variety of storage systems including both disk platter 116 and a solid state memory.

Figure 2:
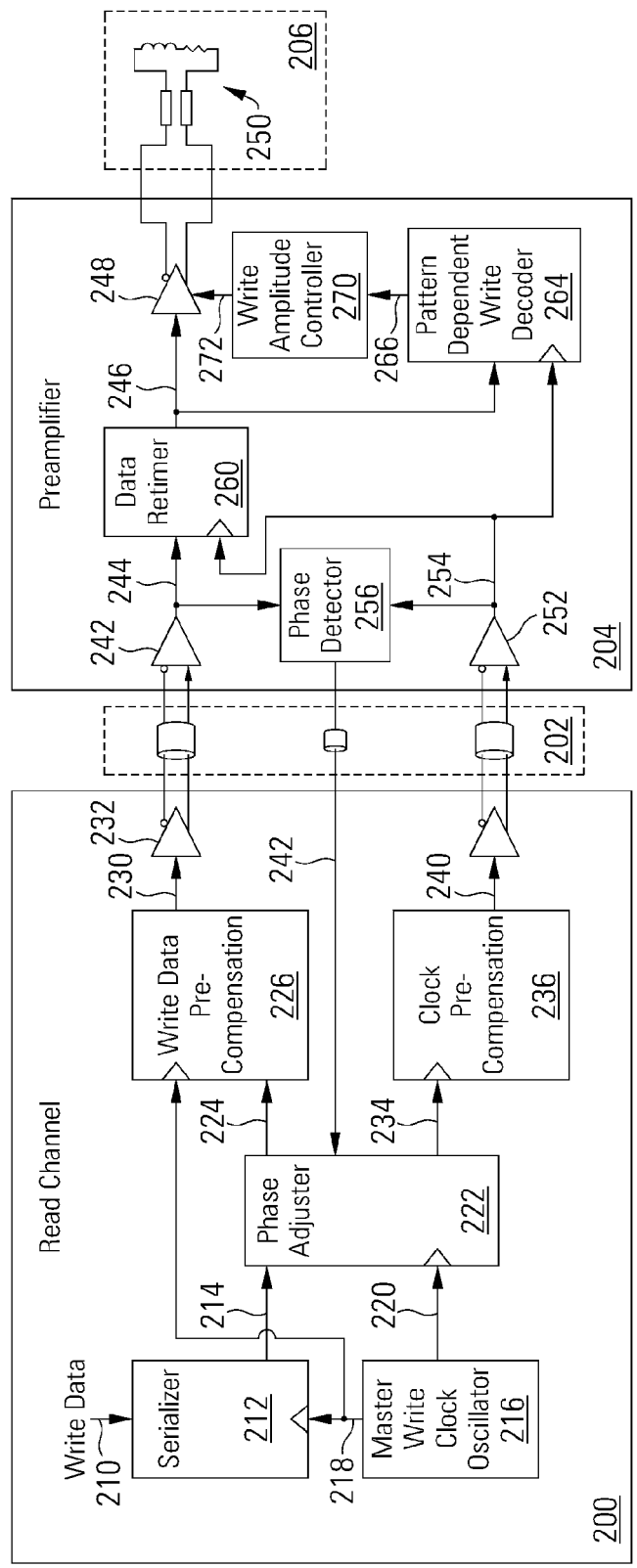
FIG. 2 depicts an embodiment of a read channel, preamplifier and magnetic write head suitable for use in a storage system with pattern dependent write in accordance with some embodiments of the present invention.

Turning to FIG. 2, a read channel 200, preamplifier 204 and magnetic write head 206 suitable for use in a storage system with pattern dependent write are shown in accordance with some embodiments of the present invention. In some embodiments, the preamplifier 204 is embodied as an integrated circuit, and the read channel 200 is included in an integrated circuit such as, but not limited to, a system on a chip (SOC), connected to the preamplifier 204 by a flexible cable or flexible circuit. Encoded write data 210 is provided to a serializer 212 in read channel 200, where it is synchronized to a write clock 218 from a master write clock oscillator 216 and converted if needed to yield serial write data 214. In some embodiments, master write clock oscillator 216 is a source off-chip. Encoded write data 210 can be obtained from any source, such as a data encoder (not shown) in read channel 200. The serializer 212 can be, but is not limited to, a shift register, or in some other embodiments, a time-division data multiplexer. Based on the disclosure herein, one of ordinary skill in the art will recognize a variety of circuits that may be used to serialize the encoded write data 210, such as, but not limited to, a shift register. The master write clock oscillator 216 can be any circuit or device for generating a clock signal 218, such as a multiphase ring oscillator forming part of a frequency synthesizer locked to a reference crystal source.

The write data 210 is prepared in the read channel 200 to be written by the write head assembly 206 to the magnetic storage medium. Writing information to a magnetic storage medium includes generating a magnetic field in proximity to the storage medium to be written. In particular, a magnetic field generated to write a current bit pattern may exhibit a non-linear transition shift (NLTS) caused by magnetic interactions between the write-field and already written transitions in high density magnetic recording. Non-linear transition shift leads to data-dependent nonlinear distortions in the read back signal, causing degradation in data-recovery performance, and is countered by use of a magnetic precompensation circuit or write data precompensation circuit 226 in the write data path. The write data precompensation circuit 226 applies pattern-dependent delays to the write data as it is impressed in the magnetic write head 206 to compensate for non-linear transition shift such that each bit of the write data is written to a desired location on the storage medium.

It should be noted that while various components of the read channel 200 and preamplifier 204 are described as "circuits" that they may be implemented either as an electronic circuit or as a software/firmware circuit. Such software/firmware circuits include a processor associated with a memory device that includes instructions executable by the processor to perform the particular functions described herein. Such processors may be general purpose processors or processors specifically tailored to perform a given function depending upon the particular implementation requirements. In some cases, the processor may be designed to perform functions related to more than one particular module. Based on the disclosure provided herein, one of ordinary skill in the art will recognize a variety of combinations of dedicated electronic circuitry and software/firmware that may be used in accordance with different embodiments of the present invention.

The magnetic write data 230, which in some embodiments is write-precompensated, is provided to a driver 232, which transmits the magnetic write data 230 in differential or other form across a flexible cable 202 to the arm-mounted preamplifier 204. For example, in some embodiments, the magnetic write data 230 is transmitted over a WDX/WDY pair of transmission lines in the flexible cable 202. A receiver 242 receives the transmitted magnetic write data and provides a retimed version 246 to a write driver 248, which drives the magnetic write head 250 in a write head assembly 206 to record the data to a disk platter.

A clock 240 associated with the write data 230 is also transmitted from the read channel 200 to the preamplifier 204 via the flexible cable 202 for use in generating a pattern dependent write control signal 272 in the preamplifier 204. The clock 240 is derived from a clock signal 220 from the master write clock oscillator 216. In some embodiments, the clock 240 is a half rate clock, at half the frequency of the clock 220 used to synchronize the write data 214. In the half rate clock 240, each data period has either a positive edge or a negative edge, whereas full rate clock 220 has a positive edge and a negative edge per data period. In some of these embodiments, the frequency of the clock 254 is effectively increased in preamplifier 204. In some embodiments the frequency of the clock 254 is effectively increased using a clock doubler to restore the half rate clock 240 to a full rate clock. In some other embodiments the frequency of the clock 254 is effectively increased using a pair of parallel shift registers, one of which shifts on the rising edge of clock 240, the other which shifts on the falling edge, with the outputs of the shift registers ping ponging depending on the phase of the clock. The outputs of such a pair of parallel shift registers are ultimately multiplexed together. This effective decrease and increase of clock signals can be performed in any suitable manner and at any suitable point in the read channel 200 and preamplifier 204, for example using a clock doubler or parallel shift registers. This effective decrease and increase of clock signals is also referred to herein as "reducing a frequency of the clock in the read channel and increasing the frequency of the clock in the preamplifier".

In some embodiments, the relative phase of the write data 214 and clock 220 is adjusted in a phase adjuster 222, yielding phase adjusted write data 224 which is processed in write data precompensation circuit 226, and phase adjusted clock 234. The phase adjuster 222 controls a phase relationship between signals derived from the write data 214 and clock 220, either to reduce a phase difference between them or to establish a particular phase difference between them, such as a 90 degree phase difference. In some embodiments, the phase adjuster 222 delays either the phase adjusted write data 224 or the phase adjusted clock 234 based on the output of a phase detector 256. The phase adjuster 222 can be located at any suitable location using any suitable circuit. For example, in some embodiments, phase adjuster 222 is incorporated in read channel 200. Phase adjuster 222 can even be located in preamplifier 304 in some embodiments.

In some embodiments, precompensation is also applied in the clock path in clock precompensation circuit 236, yielding precompensated clock 240. In various embodiments, the clock 240 can include some, all or none of the features shown in FIG. 2, including the half rate frequency, precompensation, and phase adjustment. In embodiments containing multiple clock adjustment features such as both precompensation and phase adjustment, the order of applying the adjustment features is not limited to the order shown in FIG. 2.

The clock 240 is transmitted over flexible cable 202, for example in an RDP/RDN pair of transmission lines, and is received by receiver 252 in preamplifier 204. The received clock 254 is provided to a phase detector 256, which measure the phase difference between the write data 244 and clock 254 and controls the phase adjuster 222 in read channel 200. The phase difference feedback 242 can be provided directly from preamplifier 204 to read channel 200, or can be provided through a controller (not shown) from preamplifier 204 to read channel 200. Notably, the placement of the phase detector 256 in the preamplifier 204 shown in FIG. 2 does not necessarily indicate which signals derived from write data 214 and clock 220 are compared in phase detector 256, nor the location of phase detector 256. Indeed, in some embodiments, phase detector 256 can be placed in read channel 200 if delays in flexible cable 202 and preamplifier 204 are minimal or fixed and/or otherwise accounted for. In general, the output of the phase detector 256 is used to apply selective delays in the data or clock signals in the phase adjuster 222 so that signal 244 is properly aligned with signal 254, compensating for differences in path length and other characteristics in the read channel 200 and the preamplifier 204. The data and clock signals can be obtained at any suitable point in the preamplifier 204 or even in read channel 200 to achieve this objective.

In some embodiments, multiple phase detectors are included, with one phase detector 256 monitoring a phase offset between write data 244 and clock 254 as shown in FIG. 2. This phase detector 256 facilitates the retiming in data retimer 260. Another phase detector monitors a phase offset between retimed write data 246 and pattern dependent write control signal 272. This phase detector provides optimal placement in time of retimed write data 246 with respect to pattern dependent write control signal 272 so that overshoot pulses are correctly applied as data is written. (Notably, alignment does not necessarily indicate that the phase difference between the monitored signals is zero. In some embodiments, the phase difference is set at a desired value, zero or otherwise.) Multiple corresponding phase adjusters can be included to establish the desired alignment between the signals monitored by each of the phase detectors.

The received clock 254 is also used in preamplifier 204 to retime the write data 244 in data retimer 260, yielding retimed write data 246. In some embodiments, data retimer 260 comprises a flip flop, or multiple flip flops, or shift register(s), etc, and may have a single output or multiple outputs.

Retimed write data 246 and clock 254 are provided to a pattern dependent write decoder 264 (also referred to as an overshoot amplitude decoder) in preamplifier 204, yielding a pattern indication signal 266 which specifies a desired write current level based at least in part on the specific data pattern in the retimed write data 246. In various embodiments, the pattern dependent write decoder 264 can generate the pattern indication signal 266 based on any number of bits, comprising preceding bits, following bits, or a mixture of preceding and following bits to a bit being written. The pattern indication signal 266 can have any format, such as, but not limited to, a binary signal specifying either of two write current levels, or a ternary signal or multi-bit binary signal specifying from among more than two write current levels. The pattern indication signal 266 is provided to a write amplitude controller 270 which yields the pattern dependent write control signal 272, used to control the write current amplitude in the magnetic write head 250. In some embodiments, the write amplitude controller 270 comprises a digital to analog converter, converting a digital value represented by pattern indication signal 266 to a current at the desired level, establishing the write current level produced by driver 248.

The storage system with pattern dependent write is not limited to use with any particular pattern dependent write algorithm, or any particular pattern dependent write control signal 272 format or characteristics. Indeed, by performing the pattern dependent write decoding in the preamplifier, any number of pattern dependent write schemes can be implemented by replacing or configuring the preamplifier, without having to alter the read channel. The pattern dependent write control signal 272 can thus have any desired characteristics, such as the number of levels or amplitudes representing different overshoot pulse characteristics to apply in the write current. In general, the pattern dependent write system modulates the write current used in magnetic write head 250 to record the write data on the magnetic storage medium, thereby compensating for magnetic effects which would otherwise degrade the written magnetic signal. A variety of characteristics of the write current waveform used to force magnetization switching of a pole tip in the magnetic write head 250 can be controlled in various embodiments of a pattern dependent write algorithm to improve recording performance, including but not limited to overshoot amplitude, overshoot duration, steady state current $I_w$, current rise time, etc. The adaptation or variation of the write current is based in some embodiments on the initial magnetic state of the pole tip (saturated or unsaturated) and the length of the constant data sequence to be recorded (short or long). The initial magnetic state of the pole tip is determined in some embodiments by the prior data sequence length. If a long data sequence of a particular state has just been written, the pole tip will have had sufficient time to become magnetically saturated. If the data signal has recently changed state, the pole tip will not have had sufficient time to become magnetically saturated in the last state. An aggressive write current pulse setting, or relatively high write current, can be used to switch the pole tip quickly and effectively from one saturated state to the opposite saturated state. A less aggressive setting, or relatively low write current, can be used to switch the pole tip from an unsaturated state. In some embodiments, the length of the data sequence between transitions is considered. In the case of single bit or very short following data sequence or a given state, an aggressive setting is used for faster magnetic switching. In the case of a long future sequence of a given state, a less aggressive setting is used.

Again, by transmitting the clock 240 over the flexible cable along with the write data 230 from the read channel 200 to the preamplifier 204, the pattern dependent write control signal 272 can be generated in the preamplifier 204, simplifying the design of the read channel 200, reducing the signal integrity and/or bandwidth requirements and/or number of conductors in the flexible cable 202, and allowing a wider range of pattern dependent write systems to be supported by changing the design or settings in the preamplifier 204. Furthermore, in some embodiments, the clock is used in a heat assisted magnetic recording (HAMR) system in the preamplifier. In various embodiments, either or both a pattern dependent write system and heat assisted magnetic recording system can be supported in preamplifier based on a clock transmitted over the flexible cable.

Figure 3:
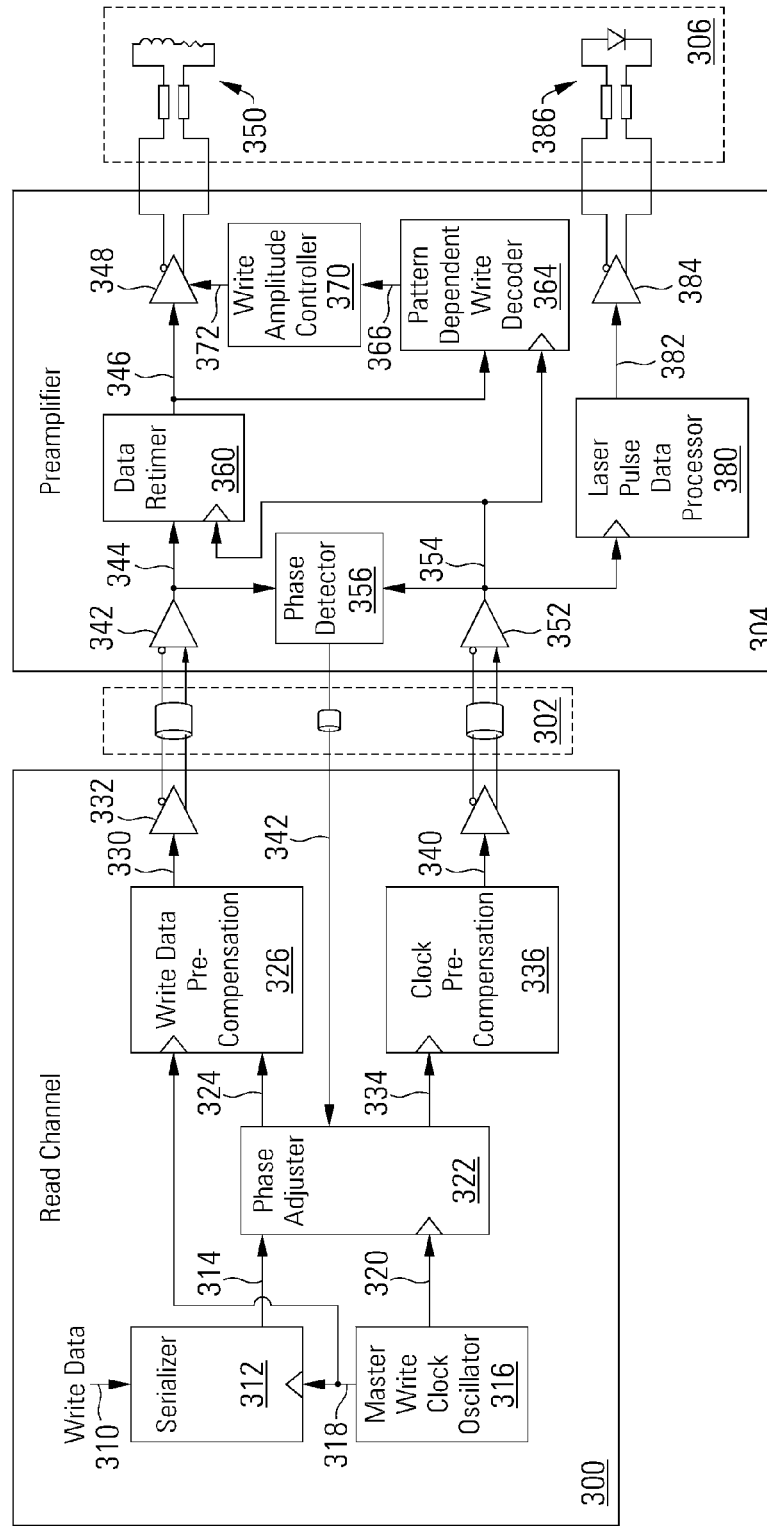
FIG. 3 depicts an embodiment of a read channel, preamplifier and magnetic write head suitable for use in a storage system with pattern dependent write and heat assisted magnetic recording in accordance with some embodiments of the present invention.

Turning to FIG. 3, a read channel 300, preamplifier 304 and magnetic write head 306 suitable for use in a storage system with pattern dependent write and heat assisted magnetic recording are shown in accordance with some embodiments of the present invention. In this embodiment, the clock 340 transmitted from read channel 300 to preamplifier 304 via flexible cable 302 can be used in preamplifier 304 to control either or both heat assisted magnetic recording features and pattern dependent write features. In some embodiments, the heat assisted magnetic recording features and/or pattern dependent write features in preamplifier 304 can be enabled and disabled or selectively not included in the preamplifier 304.

Encoded write data 310 is provided to a serializer 312 in read channel 300, where it is synchronized to a write clock 318 from a master write clock oscillator 316 and converted if needed to yield serial write data 314. Encoded write data 310 can be obtained from any source, such as a data encoder (not shown) in read channel 300. The serializer 312 can be, but is not limited to, a shift register, or in some other embodiments, a time-division data multiplexer. Based on the disclosure herein, one of ordinary skill in the art will recognize a variety of circuits that may be used to serialize the encoded write data 310, such as, but not limited to, a shift register. The master write clock oscillator 316 can be any circuit or device for generating a clock signal 318, such as a multiphase ring oscillator forming part of a frequency synthesizer locked to a reference crystal source.

The write data 310 is prepared in the read channel 300 to be written by the write head assembly 306 to the magnetic storage medium. A write data precompensation circuit 326 applies pattern-dependent delays to the write data edges as it is impressed in the magnetic write head 306 to compensate for non-idealities such as non-linear transition shift such that each edge of the write data is written to a desired location on the storage medium.

The magnetic write data 330, which in some embodiments is write-precompensated, is provided to a driver 332, which transmits the magnetic write data 330 in differential or other form across a flexible cable 302 to the arm-mounted preamplifier 304. For example, in some embodiments, the magnetic write data 330 is transmitted over a WDX/WDY pair of transmission lines in the flexible cable 302. A receiver 342 receives the transmitted magnetic write data and provides a retimed version 346 to a write driver 348, which drives the magnetic write head 350 in a write head assembly 306 to record the data to a disk platter.

A clock 340 associated with the write data 330 is also transmitted from the read channel 300 to the preamplifier 304 via the flexible cable 302 for use in generating a pattern dependent write control signal 372 in the preamplifier 304. The clock 340 is derived from a clock signal 320 from the master write clock oscillator 316. In some embodiments, the clock 340 is a half rate clock, at half the frequency of the clock 320 used to synchronize the write data 314. In the half rate clock 340, each data period has either a positive edge or a negative edge, whereas full rate clock 320 has a positive edge and a negative edge per data period. In some of these embodiments, the frequency of the clock 354 is effectively increased in preamplifier 304. In some embodiments the frequency of the clock 354 is effectively increased using a clock doubler to restore the half rate clock 340 to a full rate clock. In some other embodiments the frequency of the clock 354 is effectively increased using a pair of parallel shift registers, one of which shifts on the rising edge of clock 340, the other which shifts on the falling edge, with the outputs of the shift registers ping ponging depending on the phase of the clock. The outputs of such a pair of parallel shift registers are ultimately multiplexed together. This effective decrease and increase of clock signals can be performed in any suitable manner and at any suitable point in the read channel 300 and preamplifier 304, for example using a clock doubler or parallel shift registers. This effective decrease and increase of clock signals is also referred to herein as "reducing a frequency of the clock in the read channel and increasing the frequency of the clock in the preamplifier".

In some embodiments, the relative phase of the write data 314 and clock 320 is adjusted in a phase adjuster 322, yielding phase adjusted write data 324 which is processed in write data precompensation circuit 326, and phase adjusted clock 334. The phase adjuster 322 controls a phase relationship between signals derived from the write data 314 and clock 320, either to reduce a phase difference between them or to establish a particular phase difference between them, such as a 90 degree phase difference. In some embodiments, the phase adjuster 322 delays either the phase adjusted write data 324 or the phase adjusted clock 334 based on the output of a phase detector 356. The phase adjuster 322 can be located at any suitable location using any suitable circuit. For example, in some embodiments, phase adjuster 322 is incorporated in read channel 300. Phase adjuster 322 can even be located in preamplifier 304 in some embodiments.

In some embodiments, precompensation is also applied in the clock path in clock precompensation circuit 336, yielding precompensated clock 340. In various embodiments, the clock 340 can include some, all or none of the features shown in FIG. 3, including the half rate frequency, precompensation, and phase adjustment. In embodiments containing multiple clock adjustment features such as both precompensation and phase adjustment, the order of applying the adjustment features is not limited to the order shown in FIG. 3.

The clock 340 is transmitted over flexible cable 302, for example in an RDP/RDN pair of transmission lines, and is received by receiver 352 in preamplifier 304. The received clock 354 is provided to a phase detector 356, which measures the phase difference between the write data 344 and clock 354 and controls the phase adjuster 322 in read channel 300. The phase difference feedback 342 can be provided directly from preamplifier 304 to read channel 300, or can be provided through a controller (not shown) from preamplifier 304 to read channel 300. Notably, the placement of the phase detector 356 in the preamplifier 304 shown in FIG. 3 does not necessarily indicate which signals derived from write data 314 and clock 320 are compared in phase detector 356, nor the location of phase detector 356. Indeed, in some embodiments, phase detector 356 can be placed in read channel 300 if delays in flexible cable 302 and preamplifier 304 are minimal or fixed and/or otherwise accounted for. In general, the output of the phase detector 356 is used to apply selective delays in the data or clock signals in the phase adjuster 322 so that the that signal 344 is properly aligned with signal 354, compensating for differences in path length and other characteristics in the read channel 300 and the preamplifier 304. The data and clock signals can be obtained at any suitable point in the preamplifier 304 or even in read channel 300 to achieve this objective.

In some embodiments, multiple phase detectors are included, with one phase detector 356 monitoring a phase offset between write data 344 and clock 354 as shown in FIG. 3. This phase detector 356 facilitates the retiming in data retimer 360. Another phase detector monitors a phase offset between retimed write data 346 and pattern dependent write control signal 372. This phase detector provides optimal placement in time of retimed write data 346 with respect to pattern dependent write control signal 372 so that overshoot pulses are correctly applied as data is written. Another phase detector monitors a phase offset between retimed write data 346 and laser trigger pulse signal 382. This phase detector provides proper alignment of laser pulses for heat assisted magnetic recording with respect to retimed write data 346. (Notably, alignment does not necessarily indicate that the phase difference between the monitored signals is zero. In some embodiments, the phase difference is set at a desired value, zero or otherwise.) Multiple corresponding phase adjusters can be included to establish the desired alignment between the signals monitored by each of the phase detectors.

The received clock 354 is also used in preamplifier 304 to retime the write data 344 in data retimer 360, yielding retimed write data 346. In some embodiments, data retimer 360 comprises a flip flop, or multiple flip flops, or shift register(s), etc, and may have a single output or multiple outputs.

Retimed write data 346 and clock 354 are provided to a pattern dependent write decoder 364 (also referred to as an overshoot amplitude decoder) in preamplifier 304, yielding a pattern indication signal 366 which specifies a desired write current level based at least in part on the specific data pattern in the retimed write data 346. In various embodiments, the pattern dependent write decoder 364 can generate the pattern indication signal 366 based on any number of bits, comprising preceding bits, following bits, or a mixture of preceding and following bits to a bit being written. The pattern indication signal 366 can have any format, such as, but not limited to, a binary signal specifying either of two write current levels, or a ternary signal or multi-bit binary signal specifying from among more than two write current levels. The pattern indication signal 366 is provided to a write amplitude controller 370 which yields the pattern dependent write control signal 372, used to control the write current amplitude in the magnetic write head 350. In some embodiments, the write amplitude controller 370 comprises a digital to analog converter, converting a digital value represented by pattern indication signal 366 to a current at the desired level, establishing the write current level produced by driver 348.

The storage system with pattern dependent write is not limited to use with any particular pattern dependent write algorithm, or any particular pattern dependent write control signal 372 format or characteristics. In general, the pattern dependent write system modulates the write current used in magnetic write head 350 to record the write data on the magnetic storage medium, thereby compensating for magnetic effects which would otherwise degrade the written magnetic signal.

The clock 354 is also used in preamplifier 304 to support heat assisted magnetic recording features. Clock 354 is provided to laser pulse data processor 380 which generates a laser trigger pulse signal 382. The laser trigger pulse signal 382 is provided to transmitter 384 to drive a laser 386 in the write head assembly 306 as data bits are written by the magnetic write head 350. The laser 386 is pulsed in conjunction with the data bits written by the magnetic write head 350, heating the magnetic recording medium as data is written to it by the write head 350, allowing the write head 350 to more easily switch the magnetic orientation on the medium to store the data bit. The storage system with pattern dependent write can be used with any heat assisted magnetic recording system, such as, but not limited to, that disclosed in U.S. patent application Ser. No. 13/346,102 filed on Jan. 9, 2012 for a "Heat Assisted Magnetic Recording System", which is incorporated by reference herein for all purposes.

Figure 4:
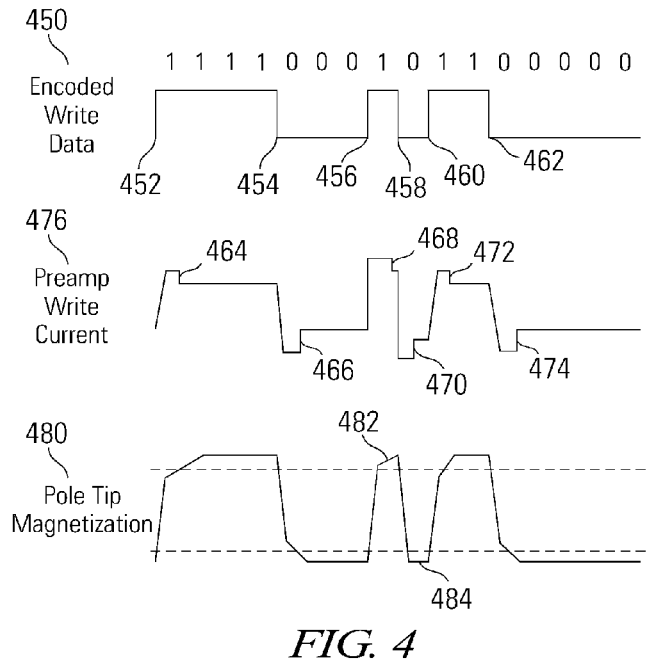
FIG. 4 depicts example waveforms for channel data, multi-level write current generated in the preamplifier and write head magnetic field response in accordance with some embodiments of the present invention.

The storage system with pattern dependent write can also be used with any pattern dependent write system, such as, but not limited to, that disclosed in U.S. patent application Ser. No. 13/302,169 filed on Nov. 22, 2011 for a "Magnetic Recording System With Multi-Level Write Current", which is incorporated by reference herein for all purposes. An example of the modulated multi-level write current that is generated by some embodiments of a pattern dependent write system is shown in FIG. 4. In this example, the write data includes the values "1111000101100000". For each of the transitions 452, 454, 456, 458, 460 and 462, a corresponding overshoot pulse 464, 466, 468, 470, 472 and 474 is generated in the preamplifier (e.g., 204) by applying different write current amplitudes through the magnetic write head (e.g., 250), based on a pattern dependent write control signal (e.g., 272) generated in the preamplifier. Transition 454 has a long constant value prior data sequence and a long following constant value data sequence, so overshoot pulse 466 has a conventional overshoot pulse. Transition 456 has a long prior data sequence and a short following data sequence, so corresponding overshoot pulse 468 has a higher current amplitude and duration. Transition 458 has a short prior data sequence and a short following data sequence, so corresponding overshoot pulse 470 has a higher (although opposite polarity) current amplitude. Transition 460 has a short prior data sequence and a long following data sequence, so corresponding overshoot pulse 472 has a lower current amplitude and shorter duration. Transition 462 has a long prior data sequence and a long following data sequence, so corresponding overshoot pulse 474 has a conventional current amplitude and duration. As a result of the variations in the settings of the overshoot pulses (e.g., 466, 468, 470, 472 and 474), the pole tip magnetization 480 fully reaches the saturated state for long enough to properly store the data bits on the magnetic medium, for example at locations 482 and 484 which might otherwise produce errors without the pattern dependent write system with its multi-level write current.

Figure 5:
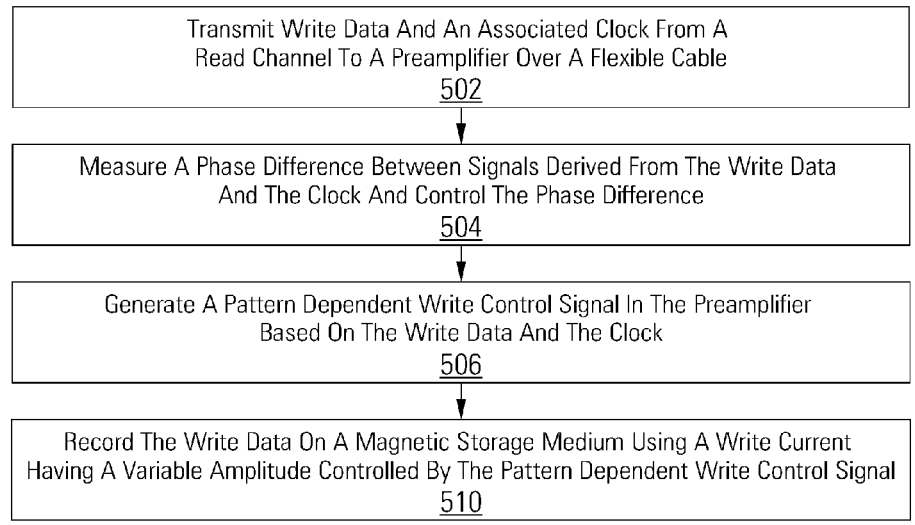
FIG. 5 depicts a flow diagram of an operation for magnetic recording with pattern dependent write in accordance with some embodiments of the present invention.

Turning to FIG. 5, a flow diagram 500 shows a method for magnetic recording with pattern dependent write in accordance with some embodiments of the present invention. Following flow diagram 500, write data and an associated clock is transmitted from a read channel to a preamplifier over a flexible cable. (Block 502) A phase difference is measured between the write data and the clock and the phase difference is compensated for. (Block 504) A pattern dependent write control signal is generated in the preamplifier based on the write data and the clock. (Block 506) The write data is recorded on a magnetic storage medium using a write current having a variable amplitude controlled based on the pattern dependent write control signal. (Block 510)

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, embodiments of the present invention provide novel systems, devices, methods and arrangements for deriving a pattern dependent write control signal in a magnetic recording system preamplifier based on a data signal and a clock signal. While detailed descriptions of one or more embodiments of the invention have been given above, various alternatives, modifications, and equivalents will be apparent to those skilled in the art without varying from the spirit of the invention. Therefore, the above description should not be taken as limiting the scope of embodiments of the invention which are encompassed by the appended claims.

What is claimed is:

1. A storage system, comprising:
a magnetic write head;
a magnetic storage medium;
a read channel operable to process write data to be recorded on the magnetic storage medium by the magnetic write head; and
a preamplifier operable to receive the write data and an associated clock from the read channel, to generate a pattern dependent write control signal based on a pattern in the write data and on the clock, and to set a write current level through the magnetic write head to a plurality of different current levels based on the pattern dependent write control signal.

2. The storage system of claim 1, further comprising a flexible cable including a write data transmission line and a clock transmission line between the read channel and the preamplifier.

3. The storage system of claim 1, wherein a pattern dependent write algorithm controlled by the pattern dependent write control signal can be changed by changing the preamplifier without changing the read channel.

4. The storage system of claim 1, further comprising a phase detector operable to measure a phase difference between signals derived from the write data and the clock.

5. The storage system of claim 4, further comprising a phase adjuster operable to control the phase difference between the signals derived from the write data and the clock.

6. The storage system of claim 1, wherein the clock transmitted from the read channel to the preamplifier comprises a half rate clock with respect to the write data.

7. The storage system of claim 1, wherein the read channel comprises a precompensation circuit operable to apply pattern-dependent delays to the clock.

8. The storage system of claim 1, wherein the preamplifier comprises a data retimer operable to synchronize the write data based on the clock received from the read channel.

9. The storage system of claim 1, wherein the preamplifier comprises a pattern dependent write decoder operable to identify the pattern in the write data while generating the pattern dependent write control signal.

10. The storage system of claim 1, wherein the preamplifier comprises a write amplitude controller operable to set the write current level through the magnetic write head to the plurality of different current levels based on the pattern dependent write control signal.

11. The storage system of claim 1, wherein the plurality of different current levels yield different overshoot pulse levels in the magnetic write head.

12. The storage system of claim 1, wherein the preamplifier is operable to generate pulses to a heat assisted magnetic recording laser based at least in part on the clock received from the read channel.

13. The storage system of claim 1, wherein at least one of the preamplifier and the read channel are implemented as an integrated circuit.

14. A method of magnetically recording data, comprising:
transmitting write data and an associated clock from a read channel to a preamplifier via a flexible cable;
generating a pattern dependent write control signal in the preamplifier based on the write data and the clock received from the read channel; and
recording the write data on a magnetic storage medium using a write current having a variable amplitude controlled by the pattern dependent write control signal.

15. The method of claim 14, further comprising measuring a phase difference between the write data and the clock and controlling a phase of either the write data or the clock based on the phase difference.

16. The method of claim 14, further comprising retiming the write data in the preamplifier based on the clock.

17. The method of claim 14, further comprising applying precompensation to the clock in the read channel.

18. The method of claim 14, further comprising reducing a frequency of the clock in the read channel and increasing the frequency of the clock in the preamplifier.

19. The method of claim 14, further comprising generating a heat assisted magnetic recording laser control signal in the preamplifier based at least in part on the clock.

20. A storage system comprising:
a magnetic storage medium;
a write head operable to record data on the magnetic storage medium as a write current flows through the write head;
a read channel operable to process write data to be recorded on the magnetic storage medium;
a preamplifier operable to process the write data to generate the write current; and
a flexible cable operable to transmit the write data and an associated clock from the read channel to the preamplifier, wherein the preamplifier comprises a pattern dependent write system operable to vary a level of the write current based on the clock and a pattern of the write data, and wherein the preamplifier comprises a heat assisted magnetic recording system operable to heat the magnetic storage medium as the data is recorded based at least in part on the clock.

* * * * *